(12) United States Patent
Trantham et al.

(10) Patent No.: US 9,390,761 B2
(45) Date of Patent: Jul. 12, 2016

(54) DATA STORAGE DEVICE WITH WEAR LEVEL IDENTIFICATION

(71) Applicant: Seagate Technology LLC, Cupertino, CA (US)

(72) Inventors: Jon D. Trantham, Chanhassen, MN (US); Mehmet F. Erden, St. Louis Park, MN (US); Tim Rausch, Farmington, MN (US); Troy De Jongh, Shakopee, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 14/552,163

(22) Filed: Nov. 24, 2014

(65) Prior Publication Data

US 2016/0148652 A1    May 26, 2016

(51) Int. Cl.
| | | |
|---|---|---|
| G11B 27/36 | (2006.01) | |
| G11B 20/18 | (2006.01) | |
| G11B 5/48 | (2006.01) | |
| G11B 5/10 | (2006.01) | |
| G11B 5/31 | (2006.01) | |
| G11B 5/60 | (2006.01) | |

(52) U.S. Cl.
CPC ........ *G11B 27/36* (2013.01); *G11B 5/10* (2013.01); *G11B 5/3106* (2013.01); *G11B 5/4866* (2013.01); *G11B 5/6088* (2013.01); *G11B 20/1816* (2013.01); *G11B 2220/2508* (2013.01); *G11B 2220/90* (2013.01)

(58) Field of Classification Search
CPC .............. G11B 2220/90; G11B 15/087; G11B 5/3106; G11B 5/8404; G11B 5/7325; G11B 5/6005; G11B 21/21; G11B 27/36; G11B 5/3183; G11B 5/10; G11B 5/1278; G11B 5/3925; G11B 5/484; G11B 5/4866; G11B 5/6088; G11B 5/314; G11B 2005/0021
USPC ............ 360/75, 27, 234.2, 130.34, 135; 369/13.02, 13.13, 13.33
See application file for complete search history.

(56) References Cited

U.S. PATENT DOCUMENTS

| | | | | |
|---|---|---|---|---|
| 4,974,106 | A | * | 11/1990 | White .................. G11B 5/6005 360/130.34 |
| 5,408,373 | A | * | 4/1995 | Bajorek .................... G11B 5/10 360/125.36 |
| 5,537,533 | A | | 7/1996 | Staheli et al. |
| 6,359,433 | B1 | | 3/2002 | Gillis et al. |
| 6,460,151 | B1 | | 10/2002 | Warwick et al. |
| 6,804,085 | B1 | * | 10/2004 | Azarian ............... G11B 5/3106 360/135 |
| 7,107,462 | B2 | | 9/2006 | Fransdonk |
| 7,309,816 | B1 | | 12/2007 | Bruce et al. |
| 7,333,284 | B2 | | 2/2008 | Eto et al. |
| 7,543,178 | B2 | | 6/2009 | McNeill et al. |
| 7,707,461 | B2 | | 4/2010 | Dougherty et al. |
| 7,930,475 | B1 | | 4/2011 | Kleiman et al. |
| 8,085,488 | B2 | | 12/2011 | Feliss et al. |
| 8,760,780 | B1 | | 6/2014 | Brooker |
| 2012/0176435 | A1 | | 7/2012 | Yamanobe |
| 2014/0177356 | A1 | | 6/2014 | Su et al. |

* cited by examiner

*Primary Examiner* — Ali Neyzari
(74) *Attorney, Agent, or Firm* — Hall Estill Attorneys at Law

(57) ABSTRACT

A transducing head may be connected to a controller and positioned proximal a data storage medium. The controller can be connected to a wear level identification circuit and configured to identify a first data region of the data storage medium having a first wear level and a second data region of the data storage medium having a second wear level. The first and second wear levels can respectively correspond to different amounts of component degradation of the data storage device.

20 Claims, 4 Drawing Sheets

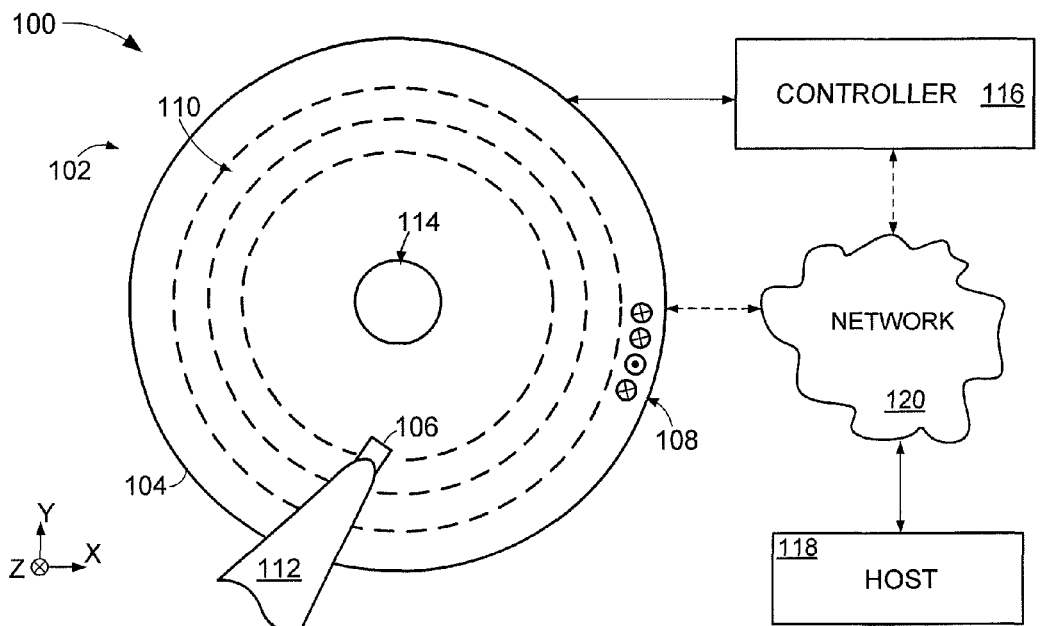
FIG. 1
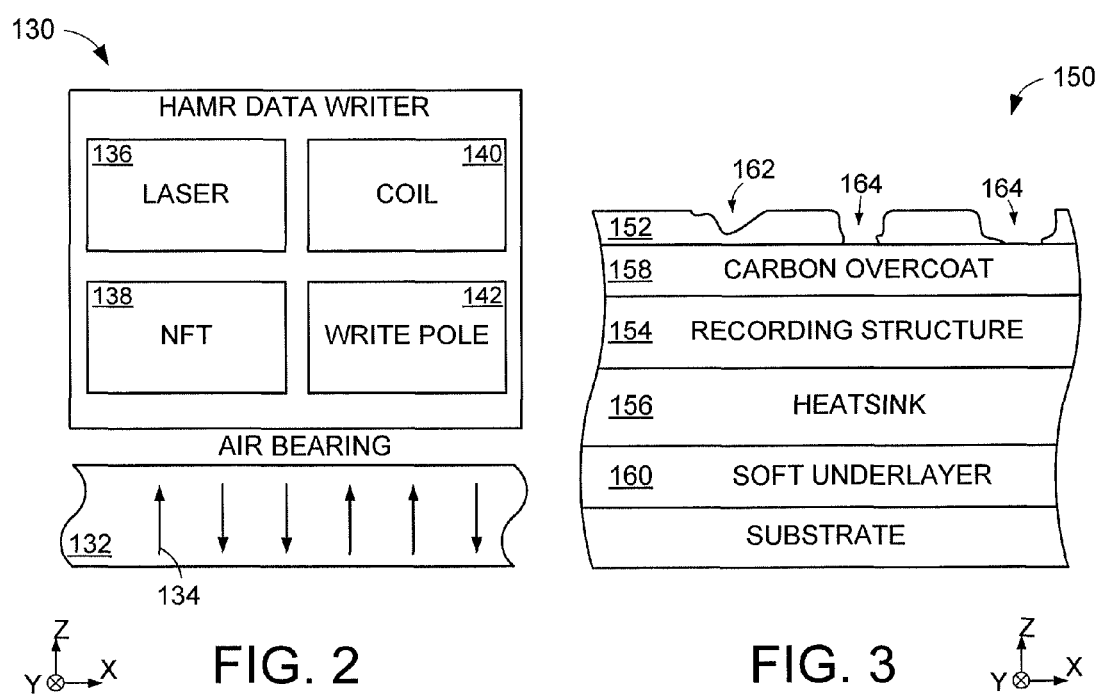
FIG. 2
FIG. 3

DATA STORAGE DEVICE WITH WEAR LEVEL IDENTIFICATION

SUMMARY

A transducing head, in various embodiments, is connected to a controller and positioned proximal a data storage medium. The controller is connected to a wear level identification circuit and configured to identify a first data region of the data storage medium having a first wear level and a second data region of the data storage medium having a second wear level with the first and second wear levels respectively corresponding to different amounts of component degradation of the data storage device.

BRIEF DESCRIPTION OF THE DRAWINGS

FIG. 1 is a block representation of an example data storage system configured and operated in accordance with some embodiments.

FIG. 2 displays a block representation of a portion of an example data writer capable of being used with the data storage system of FIG. 1.

FIG. 3 shows a cross-section view block representation of a portion of an example data storage medium configured in accordance with some embodiments.

DETAILED DESCRIPTION

Figure 4:
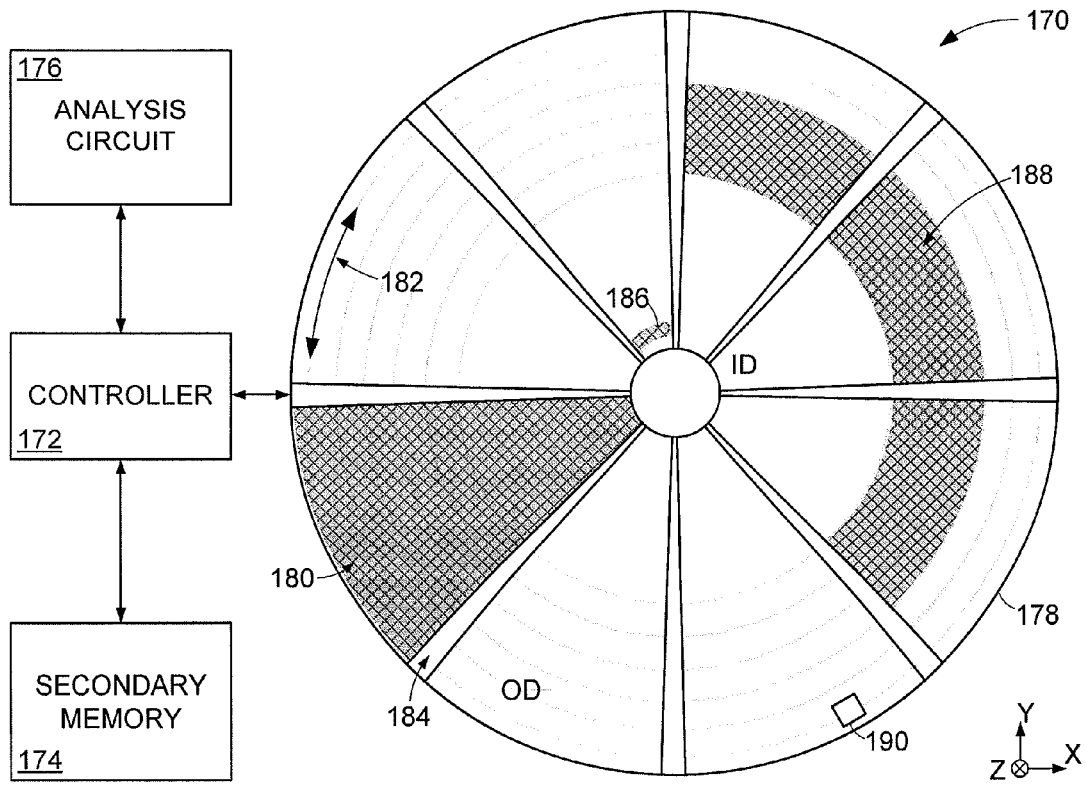
FIG. 4 illustrates a block representation of a portion of an example data storage system arranged in accordance with various embodiments.

In an effort to keep up with consumer demand for larger amounts of data storage in small form factor data storage systems, the density of data bits on a data storage medium has increased. The combination of high data bit density and high power data bit writing means, such as heat assisted magnetic recording (HAMR) data writers, has stressed the physical limits of a data storage medium. For example, repeated writing of data bits in close physical proximity can degrade components of a data storage device consisting of a recording head and medium, which can increase the risk of errors and failures. Hence, there is a continued consumer and industry interest in utilizing high power data bit writing means while still providing reliable service from the data storage device.

Accordingly, a data storage system may have at least a transducing head connected to a controller and positioned proximal a data storage medium with the controller adapted to identify different amounts of component degradation in a data storage device by correspondingly identifying first and second wear levels in respective first and second data regions of the data storage device. In some cases, the degradation is reversible. For example, the ability to detect the deterioration of lube at different regions of the data storage medium allows the data storage system to take proactive and reactive measures to mitigate existing damage and prevent future exaggeration of the deteriorated lube layer portions. Such reduction in mechanical damage to the data storage medium can optimize data storage system performance while extending the life of the data storage system.

Turning to the drawings, FIG. 1 displays a block representation of portions of a data storage system 100 that can identify multiple amounts and regions of recording medium deterioration. Although not required or limiting, the data storage system 100 can have one or more data storage devices 102 that are configured with at least one data storage means, such as solid-state, rotating hard disk drive, and electronic volatile and non-volatile memories. As shown in FIG. 1, the data storage device 102 consists of at least one rotating data storage medium 104 that is engaged by a transducing head 106 to read and write data bits 108 to and from the data storage medium 104. The transducing recording head 106 can be manipulated to ride on an air bearing proximal various different data tracks 110 by an actuator assembly 112 operating in concert with a central spindle 114.

One or more local controllers 116 can orchestrate rotation of the data storage medium 104 via the spindle 114 and position of the transducing head 106 via the actuator assembly 112 to conduct data bit writing and reading operations concurrently and/or independently. It is noted that the data bits are shown with a perpendicular orientation with respect to the air bearing and the X-Y plane, but such configuration is not limiting as the data bits may be positioned and oriented in any number of configurations. In an effort to increase the data capacity of the data storage device 102, the data bits 108 and data tracks 110 can be more densely packed onto the data storage medium 104, which corresponds with less non-magnetic material between data bits 108 positioned on the same, and different, data tracks 110.

Although one or more local controllers 116 can facilitate data access operations to and from the data storage medium 104, various embodiments connect at least one remote host 118 to the local controller 116 and/or the data storage medium 102, either directly or indirectly, such as via a wired or wireless network 120. The remote host 118 is contemplated as any number of processors, clients, servers, nodes, and application specific integrated circuits (ASICs) that can operate in concert with the local controller 116 to provide optimized data storage performance. The ability to configure the data storage system 100 with various types of memory that are monitored and controlled by local and remote controllers allows the data storage system 100 to be tuned for a diverse variety of data storage purposes and environments.

With data bit densities increasing, the ability to accurately write data to a selected data bit 108 can be difficult. Hence, HAMR data writers were developed to provide increasingly precise data bit 108 writing capabilities. FIG. 2 displays a block representation of a portion of an example data writer 130 that may be employed in the data storage system 100 of FIG. 1 to accurately write data in high data bit density data storage devices. The HAMR data writer 130 can be incorporated partially or completely on a suspended portion of a transducing head to temporarily heat portions of the data storage medium 132 to lower the magnetic coercivity of selected data bit(s) 134 to allow magnetic flux of a predetermined polarity to magnetize selected data bit(s) 134.

The data storage medium 132 may be heated via any number of heat producing means, such as a laser diode 136 that passes a beam of light energy through a near field transducer 138 to bring the data bit(s) 134 past the data storage medium's Curie temperature and allow for magnetic flux from a coil 140 through at least one write pole 142 to magnetize the data bit 134. The write pole 142 may have one or more magnetic shields 134 that allow other data access components, such as a data reader, to be positioned proximal the data writer 130 on a transducing head.

It is contemplated that the heating means of the data writer 130, which may be characterized as the laser diode 136 and near field transducer 138, can quickly generate ample heat to write data, but may also vaporize or otherwise degrade portions of the data storage medium 132 over time. For example, repeated data writes to a region of the data storage medium 132 may result in the inadvertent over-heating of a lube layer portion of the data storage medium 132 and increased data access errors and failures. It is noted that data storage medium damage is not necessarily limited to HAMR recording systems. For instance, a recording head configured for perpendicular data bit writing may also degrade its lubrication and the underling medium with prolonged access to a data region, which may correspond with mechanical contact between the recording head elements and the medium.

FIG. 3 is a cross-section block representation of a portion of an example data storage medium 150 that can experience degradation, such as through over-heating that vaporizes portions of a lube layer 152 through repeated data bit accesses. As shown, the data storage medium 150 has a recording structure 154 disposed between a heatsink 156 and carbon overcoat 158. A magnetically soft underlayer structure 160 can operate in concert with the recording structure 154 to selectively for magnetic flux loops that program a predetermined magnetic polarity to a data bit residing in the recording structure 154.

It is to be understood that the various aspects of the data storage medium 150 are not required or limiting as any portion can be altered or removed just as any additional aspects can be added. For example, the recording structure 154 can be configured as a lamination of magnetic and non-magnetic layers that form magnetic data bit grains. The lube layer 152, in accordance with various embodiments, can be constructed of a self-healing material, such as a semi-viscous lubricant, that can flow and deform over time in response to internal or external forces, such as chemical forces, surface tension, and pressure from a recording head's air bearing. That is, the lube layer 152 may be designed and configured to move autonomously and reactively to heal partial 162 and complete 164 voids that can occur due to mechanical and other trauma.

Although the lube layer 152 may be configured to be self-healing, accessing the underlying data storage structure at the location of the partial 162 and complete 164 voids can result in unwanted recording structure 154 heating and thermal stresses that jeopardize the integrity of the stored data and the life of the data storage medium 140. Hence, various embodiments utilize one or more controllers and circuitry to predict, identify, and adapt to the partial 162 and complete 164 voids in the lube layer 152 where lube material has been displaced, such as by vaporization and mechanical force. It is noted that any number of data accesses, either data reads or writes, can result in the partial 162 and complete 164 voids.

FIG. 4 illustrates a block representation of a portion of an example data storage system 170 configured to predict, identify, and mitigate the affects of loss of a data storage medium's lube layer in accordance with various embodiments. One or more local and remote controllers 172 are connected to at least one secondary memory 174 and a wear level analysis circuit 176, which can also be characterized as a wear level identification circuit. The secondary memory 174 may be any type of data storage means, such as local rotating media and remote cloud servers. The analysis circuit 176 and controller 172 can divide a data storage device into a plurality of data regions that allow data accesses to be more efficiently monitored. Regions may be catered to a specific medium 178. For instance, a data region may extend over a range of data tracks on one disk surface, across several disk surfaces, or some other means of storage subdivision, such as following groups of logical blocks or physical blocks.

The controller 172 can establish, re-configure, and remove any number of data regions on one or more data surfaces of a data storage system, such as on medium 178. In the non-limiting example shown in FIG. 4, the medium contains wedges for user data 180 and servo data 184. The controller 172 has established a first data region 188, as shown for three user wedges, but extending for all user data wedges around the disk, as a group of multiple data tracks 182 around the disk 178. Region 188 shows how the controller 172 can utilize the close physical proximity of data across multiple data tracks 182 to monitor less than all the data bits stored on the data storage medium's surface. The controller 172 may utilize data regions with different configurations, such as data region 186 that spans fewer tracks, perhaps even down to a single data track 182, or less.

The data regions may be selected based on observed and predicted movement and behavior of a transducing head 190. For example, the controller 172 and analysis circuit 174 can log transducing head 190 movement and predict that lube layer wear may more likely occur in regions that are arranged like region 188 than region 180. In other embodiments, the data region 186 may be derived after data region 188 was selected and subsequently deemed too large to efficiently monitor the number of data accesses and wear levels across all the physical block addresses (PBAs) in the data region 188.

Regardless of how and where the controller 172 creates data regions, the ability to split the PBAs of each data surface of the data storage medium 178 allows the analysis circuit 176 to log, monitor, and predict data accesses and wear levels for multiple data regions concurrently. In other words, splitting the common data surface of the data storage medium 178 into several data regions allows the controller 172 and analysis circuit 176 to employ robust processing power of a data storage system to concurrently conduct data temperature analyses that identify and predict areas of lube layer deterioration. It is noted that the term "temperature" for the purposes of this disclosure is meant as the amount of activity associated with the item instead of the actual physical temperature of an item. As such, a data location (e.g. LBA or PBA), data itself, and the data storage medium 178 as a whole can be "hot" or "cold" depending on the relative number of data accesses for the respective items over time.

Figure 5:
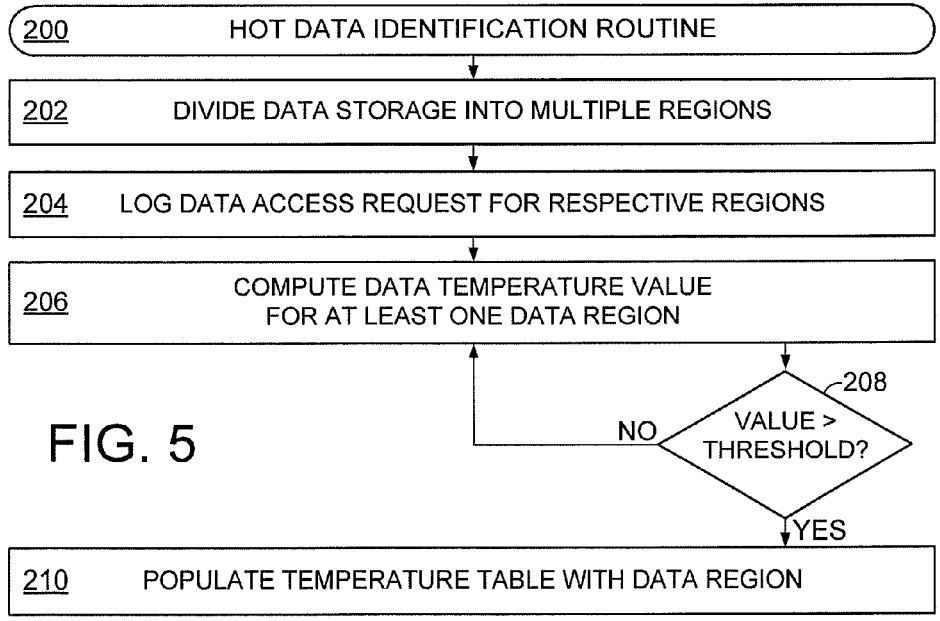
FIG. 5 conveys an example hot data management routine conducted in accordance with some embodiments.

FIG. 5 is an example hot data identification routine 200 that may be executed by a controller of a data storage system in accordance with various embodiments. It is contemplated that any number of steps and decisions can precede routine 200 and the various steps and decisions of routine 200 can be altered without limitation. The hot data identification routine 200 can begin with step 202 dividing at least one data surface of data storage system into multiple data regions. As shown in FIG. 4, the data regions can be a variety of sizes and positions on the data storage medium. In some embodiments, the data regions are each a common size, such as 1000 PBAs, or type, such as one or more data tracks in close physical proximity, while other embodiments divide the data storage medium into data regions with different sizes and types, such as zones, tracks, serpents, and block groups.

Step 202 may be undertaken during data storage device manufacturing, such as when overhead data, like servo data, are initially written to the data storage medium. Over time, the data regions initially assigned to a data storage medium may be ineffective and routine 200 can utilize 202 to further divide or re-configure one or more data regions. For example, a data region may be relocated to data tracks towards the outer diameter (OD) of the data storage medium as opposed to the inner diameter (ID) of the data storage medium. The establishment of data regions in step 202 can allow subsequent logging of data access requests and executions for the respective data regions in step 204. That is, step 204 can monitor the number, frequency, and execution of data access requests for each data region concurrently and individually. It is contemplated that step 204 can distinguish between data writes and data reads.

The logging of data access requests and executions can be conducted continuously, routinely, and randomly to provide ample data for step 206 to compute a data temperature value for at least one data region. A data temperature value may involve one or more different algorithms and tables that determine the amount of activity a data region has experienced over time. Step 206 may involve one or more predicted metrics, such as data write requests and PBA assignments, to compute the data temperature value. In the event the data temperature value for a data region is above a threshold value, as evaluated in decision 208, routine 200 proceeds to step 210 where the data region is used to populate at least one temperature table. Otherwise, step 206 is revisited and data temperature values are computed until the threshold value is met.

Through the execution of routine 200, the controller and analysis circuit of a data storage system can identify data regions that are receiving, or expected to receive, higher volumes of activity. The differentiation between hot and cold data regions with decision 208 allows the controller and analysis circuit to focus attention on data regions that have a higher level of data access activity. It is contemplated that non-user-initiated data accesses are logged in step 204 and contribute to a higher data temperature value. As a non-limiting example, various background operations, such as firmware-initiated data maintenance and movement, can be conducted and result in a data region becoming hot despite little or no user-initiated data accesses to the data region.

While a simple number of data accesses to a particular data region can correspond with the data temperature value computed in step 206, various embodiments employ greater intelligence to generate a data temperature value. The data temperature value generation scheme 220 shown in FIG. 6 generally displays how a data temperature value can be computed in accordance with some embodiments to provide greater insight into the amount of data access activity and risk of lube layer deterioration or other degradation of a data storage medium. Scheme 220 begins with receiving at least one data access request in step 222 corresponding to one or more data regions. Step 224 is triggered with receipt of the data access request in a queue in step 222, which populates a temperature table with at least one data region that is to be accessed.

It is noted that the data access request from step 222 is expected to be one of a plurality of other data accesses that have, or will, be conducted on the data region populating the temperature table in step 224. Upon entry into the temperature table, which may be stored in a secondary memory, like a cache or a different portion of a data storage medium, a timestamp is generated in step 226 and a saturating counter is initiated in step 228. The timestamp may be a simple date and time or a more complex identifier that may consist of the age and size of the data region. The saturation counter may be initialized at zero in some situations while other situations may merit a higher initial value based on the number and frequency, otherwise characterized as the hotness, of data accesses to the data region.

Any number of data regions can be monitored and subsequently inserted into the temperature table in step 224 by revisiting step 222 after step 228. With at least one data region positioned in the temperature table, step 230 can increment the saturating counter in response to a planned or executed data request to the data region. That is, a controller and analysis circuit can concurrently monitor the expected and actual data accesses to any number of data regions and correlate those data accesses to the respective data regions by incrementing the saturating counter. It is contemplated that the controller and analysis circuit may also increment a transducing head count and data zone count that monitors the age of the data transducers of the transducing head as well as the overall activity on a data zone, regardless of the size and position of data regions.

Figures 6, 7:
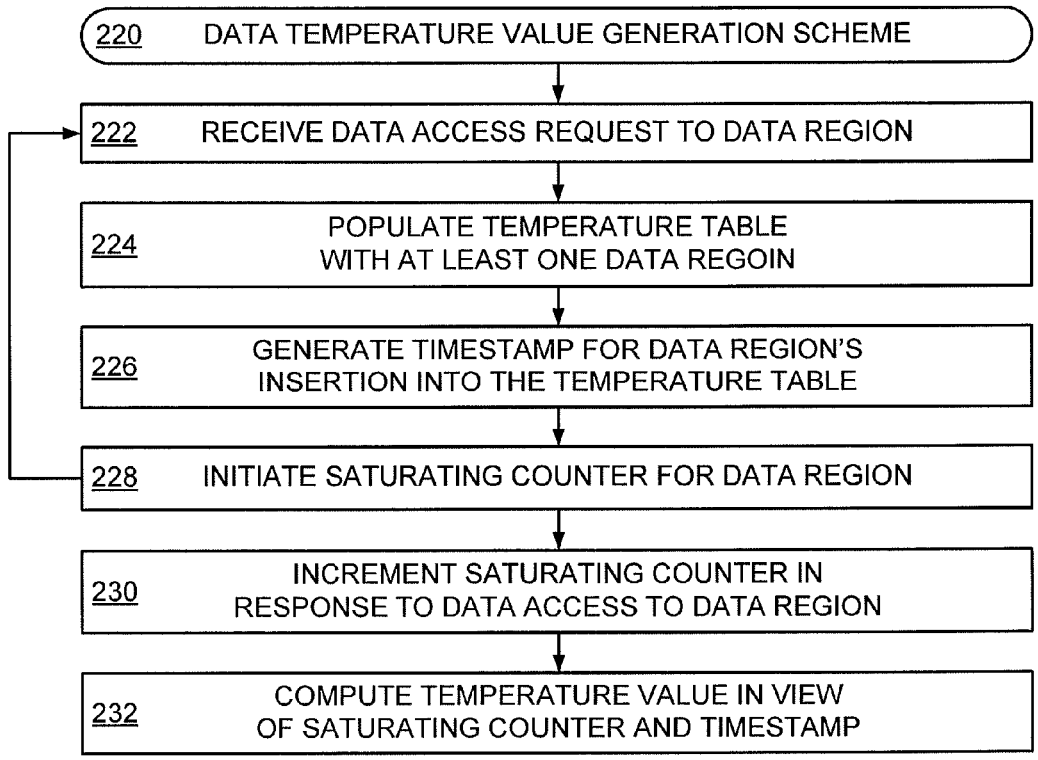
FIG. 6 is an example data temperature value generation scheme performed in accordance with assorted embodiments.
FIG. 7 displays an example temperature table populated in accordance with various embodiments.

With the timestamp and saturating counter being generated and continually updated in the temperature table, step 230 can compute a temperature value for a data region according to an algorithm that factors the age (timestamp) and hotness (saturating counter) of the data region to provide a weighted ranking. FIG. 7 is an example temperature table 240 present in an analysis circuit 242 and populated with various data regions in accordance with assorted embodiments. Although the temperature table 240 may monitor, log, and predict any number of data region metrics, the physical location, timestamp, saturation counter, and temperature value for each data region are concurrently present and updated in the non-limiting example shown in FIG. 7.

Each data region in the temperature table 240 may be identified with different characteristics, such as logical (LBAs) or physical (PBAs) block addresses, arbitrary names, and overall size, just as the timestamp for each data region can be similar or dissimilar metrics, such as overall age or the insertion date of the data region by month (M), day (D), hour (H), minute (M), and second (S). The temperature table 240 can be dynamic and various data regions can change position, either actually or logically, depending on the amount of the saturating counter and temperature value. That is, an increasing saturating counter can result in a greater computed temperature value and movement of the corresponding data region within the temperature table. For example, the data region PBA[C-D] can receive several data accesses that increase its saturating counter and temperature value above data region PBA[A-B], which would correspond with region PBA[C-D] being the hottest region and most likely to have lube layer deterioration.

In various embodiments, one or more prediction circuits are connected to the controller and analysis circuit 242 to evaluate existing data access and data region activity to provide predicted future areas and amounts of data accesses. As such, the temperature table 240 may have one or more predicted metrics, such as data access frequency, that contribute to the computed temperature value for each data region. The ability to utilize observed data access activity, predefined modeling tables, and predicted data access activity allows the analysis circuit 242 to intelligently identify the activity temperature of any number of data regions.

It is contemplated that the temperature table 240 is utilized to trigger data region management actions. For example, temperature values above a high threshold, as identified by area 244, triggers hot data mitigation operations, temperature values above a low threshold and below the high threshold, as identified by area 246, triggers increased monitoring resolution and identification of data regions as popular, and temperature values below a low threshold, but on the temperature table, as identified by area 248, triggers dividing the data regions into smaller sizes. Hence, the ability to identify data regions by data access activity with the computed temperature value allows intelligent control and manipulation of the data regions to mitigate data storage device degradation or deterioration, such as to the lube layer on the data storage medium.

It is noted that the temperature table 240 and computed temperature values can correspond with the actual and predicted amount of medium deterioration in the data region. Accordingly, the temperature table 240 can identify different amounts of medium deterioration by evaluating each data region size, position, age, data write activity, and data read activity to compute the temperature value. With a data storage medium potentially containing a plurality of data regions that are in different states of data access activity, the temperature table 240 is expected to evolve and change.

Figure 8:
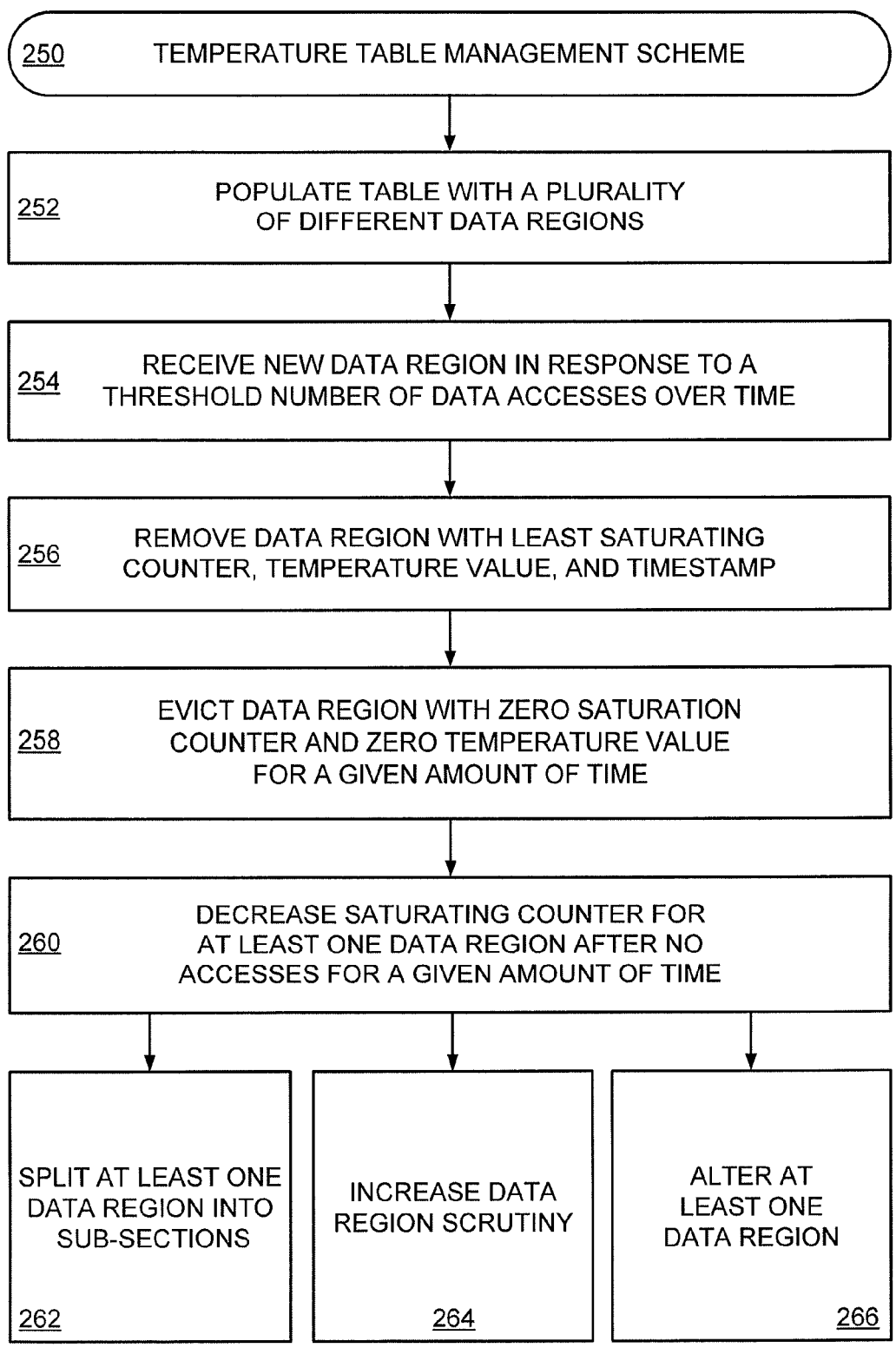
FIG. 8 plots an example temperature table management scheme carried out in accordance with some embodiments.

FIG. 8 is a flowchart of an example temperature table management scheme 250 that can be performed in accordance with various embodiments to ensure a temperature table contains current and accurate information about various data regions. Initially, step 252 can populate the temperature table with a plurality of different data regions. Although scheme 250 can be conducted with a single data region temperature table entry, the presence of multiple data regions illustrate how the temperature table can adapt to changing data region metrics.

In step 254, a new data region reaches a threshold data access activity level to be incorporated into the temperature table. However, it is expected that step 252 fully populated the temperature table. Thus, step 256 evaluates which data region entry of the temperature table to remove and proceeds to evict the selected data region entry, or entries, in step 258. Step 256 can evaluate a plethora of different criteria, but is focused on least active data entries based on the timestamp, saturating counter value, and temperature value in some embodiments. Step 258 evicts at least one data region entry from the temperature table as directed by step 256, which can choose the lowest saturating counter or temperature value in accordance with various embodiments and differentiate between equal temperature values by evicting the oldest data region entry as determined by the timestamp.

After a predetermined amount of time, or age, of a data region entry in the temperature table without a predetermined amount of data access activity, step 260 decreases the saturating value for that data region entry, which will consequently decrease the temperature value for the data region. It is contemplated that data regions can be entered into, updated, and removed from the temperature table continually and repeatedly over time. The organization and accuracy of the temperature table in representing risk of component deterioration in a data storage device allows a controller and analysis circuit of a data storage system to conduct wear mitigation techniques that can proactively and reactively reduce the chance data accesses will result in errors or failures.

While not required or limiting as data storage medium or other component wear mitigation techniques, a controller can split a data region in multiple, smaller sub-sections in step 262, increase the scrutiny of data access monitoring in step 264, and alter a data region in step 266. Step 264 can increase the scrutiny by decreasing the time between data region evaluations, catalog the data region into sub-sections without splitting the data region, and predict future data access activity for the data region in accordance with assorted embodiments.

For step 266, altering a data region can involve an unlimited variety of different activities that operate individually and collectively to mitigate component degradation, such as lube layer wear for the data region. An example data region alteration can be dividing the data region into individual data tracks, which may be similar or dissimilar than the granularity provided by step 262. Step 266 may move data to a region with a lesser data track pitch or lesser data bit density, which can collectively be described as less areal density. Because of the lower areal density, such regions can be stored at a higher recording head fly height, reducing media wear.

Some embodiments of step 266 alter the data region by delaying or suspending data access operations to some, or all, of the data region. Such data access manipulation can be tuned to allow the self-healing lube layer material to partially or completely heal voids. It is contemplated that step 266 may engage in one or more mechanical lube layer repairs, such as adjusted fly height passes to encourage lube layer displacement and the filling of partial and complete lube layer voids.

Step 266 may, in some embodiments, alter the manner in which data writes are conducted on a data region. For instance, laser power may be decreased, such as with one or more staggered laser power levels, to ensure lube layer vaporization does not occur during data access. The alteration of a data region in step 266 may trigger analysis of portions of the data region for cold status. That is, a data region designated as hot overall can initiate analysis of whether some data stored in the data region is cold and can be moved to a long-term storage location.

With the various possible data region alterations that step 266 can engage in to mitigate data access errors by identifying high data access activity, and corresponding high risk of lube layer deterioration, the scheme 250 can intelligently react to highly active regions of the data storage medium. Scheme 250 is expected to be conducted in view of the type of data storage medium and data accesses being conducted. In other words, a system controller and analysis circuit cater the criteria and thresholds for distinguishing a data region as hot and what data region alterations are to conducted in step 266 based on how data is written and stored. For example, the data storage system can cater data access activity analysis differently for a HAMR transducing head and corresponding perpendicularly oriented data bit data storage medium compared to a bit patterned medium that writes data with a non-heat assisted coil.

The ability to predict data access activity and temperature values for various data regions an allow step 266 to proactively, or reactively, re-map portions of the data storage medium to mitigate the passage of the transducing head over the active portions of the data regions. Such re-mapping may consist of changing LBA or PBA assignments, caching data in a secondary memory, such as the outer diameter of the data storage medium, a non-volatile cache, solid state electronic memory, or a different rotating data storage medium. In some embodiments, step 266 re-maps an active data region into a contiguous or serpentine LBA pattern while other embodiments can randomize PBAs on a data storage surface, which may increase data access times, but can prolong the life of the data storage device.

A non-limiting example execution of scheme 250 identifies data regions with multiple different temperature values and lube layer wear levels before suspending non-user-initiated background (firmware) operations to the data regions characterized as hot. The suspension or delay of background operations can greatly decrease the number of data accesses experienced by a data region, particularly when a system employs complex operating systems that monitor, move, and remove data passively without a user's knowledge. By engaging in proactive and reactive data region alteration tactics, the data region can maintain optimized performance over an extended period of time compared to data storage systems that do not identify high data access activity.

It is noted that the various aspects of schemes 220 and 250 as well as routine 200 are not required or limiting. As such, any step or decision can be inserted, removed, or modified from that shown in FIGS. 5, 6, & 8. Through the monitoring of data access operations to various data regions on a data storage medium, component wear, such as medium lube layer wear levels can be identified and assorted means which can be utilized to mitigate the loss of data. In data storage systems that have data writers, particularly HAMR writers that employ laser heating of the data storage medium, the identification of hot data regions and mitigation of medium and lube layer deterioration can allow prolonged life and maintained data access performance. Also, the identification of data regions by wear levels and data access activity can allow a data region to be altered to allow the lube layer to heal either automatically or through healing actions.

It is to be understood that even though numerous characteristics of various embodiments of the present disclosure have been set forth in the foregoing description, together with details of the structure and function of various embodiments, this detailed description is illustrative only, and changes may be made in detail, especially in matters of structure and arrangements of parts within the principles of the present technology to the full extent indicated by the broad general meaning of the terms in which the appended claims are expressed. For example, the particular elements may vary depending on the particular application without departing from the spirit and scope of the present disclosure.

What is claimed is:

1. An apparatus comprising at least one transducing head connected to a controller and positioned proximal a data storage medium, the controller connected to a wear level identification circuit and configured to identify a first data region of the data storage medium having a first wear level and a second data region of the data storage medium having a second wear level, the first and second wear levels corresponding to different amounts of deterioration of the data storage medium.

2. The apparatus of claim 1, wherein the transducing head has a heat assisted magnetic recording (HAMR) data writer.

3. The apparatus of claim 1, wherein the first and second wear levels respectively correspond to measurements of data storage medium lube layer deterioration.

4. The apparatus of claim 1, wherein a data bit is stored in the data storage medium magnetically oriented perpendicular to an air bearing surface (ABS).

5. The apparatus of claim 1, wherein the first data region comprises one or more data track portions of the data storage medium.

6. The apparatus of claim 1, wherein the first data region comprises less than all of a plurality of different data tracks on the data storage medium.

7. The apparatus of claim 1, wherein the first data region has a greater number of data bits than the second data region.

8. The apparatus of claim 1, wherein the first and second wear levels respectively correspond with the number of data accesses to the first and second data regions by the data writer.

9. The apparatus of claim 2, wherein the first wear level corresponds with a partially deteriorated lube layer and the second wear level corresponds with a completely deteriorated lube layer.

10. A method comprising:
positioning a transducing head proximal a first data storage medium, the data writer connected to a controller;
identifying a first wear level in a first data region of the first data storage medium with a wear level identification circuit connected to the controller; and
identifying a second wear level in a second data region of the first data storage medium with the wear level identification circuit, the first and second wear levels corresponding to different amounts of physical deterioration in the first data storage medium.

11. The method of claim 10, wherein the controller copies data from the second data region to a secondary memory.

12. The method of claim 11, wherein the secondary memory is a third data region of the first data storage medium, the first, second, and third data regions positioned on a common data surface of the first data storage medium.

13. The method of claim 12, wherein the secondary memory comprises a second data storage medium positioned on a common spindle with the first data storage medium.

14. The method of claim 11, wherein the secondary memory is a cache memory external to the data storage medium.

15. The method of claim 10, wherein the first and second wear levels are identified by a region activity value computed by the wear level identification circuit.

16. The method of claim 15, wherein the region activity value is computed with respect to a number of data accesses by the transducing head and a time in which the number of data accesses were executed.

17. The method of claim 16, wherein the controller decreases the number of data accesses in response to no data accesses being executed for a predetermined amount of time.

18. A method comprising:
positioning a transducing head proximal a data storage medium, the data writer connected to a controller;
identifying a first wear level in a first data region of the data storage medium with a wear level identification circuit connected to the controller;
identifying a second wear level in a second data region of the data storage medium with the wear level identification circuit, the first and second wear levels corresponding to different amounts of deterioration in the data storage medium; and
delaying a pending data access to the second data region.

19. The method of claim 18, wherein the controller lowers a laser writing power of a data writer portion of the transducing head prior to performing the pending data access to the second data region.

20. The method of claim 18, wherein the controller splits the first data region into a plurality of sub-sections in response to the first wear level and suspends non-user-initiated operations to the second data region in response to the second wear level.

* * * * *